United States Patent [19]

Morita

[11] 4,427,209

[45] Jan. 24, 1984

[54] BICYCLE FRAME

[76] Inventor: Norimasa Morita, 420 Shizuoka, Hontori 7-2-11 Orange Mansion 4FB, Shizuoka, Japan

[21] Appl. No.: 349,056

[22] Filed: Feb. 16, 1982

[51] Int. Cl.³ .................. B62K 3/00; B62K 19/30
[52] U.S. Cl. ................. 280/281 R; 280/283
[58] Field of Search ............. 280/281 R, 283, 274, 280/275, 259

[56] References Cited

U.S. PATENT DOCUMENTS 519,855   5/1894   Whitaker ........................... 280/283

FOREIGN PATENT DOCUMENTS

| 171483 | 11/1951 | Australia | 280/283 |
| 422730 | 6/1947 | Italy | 280/281 R |
| 11461 | of 1897 | United Kingdom | 280/281 R |
| 24313 | of 1898 | United Kingdom | 280/281 R |

Primary Examiner—John A. Pekar
Attorney, Agent, or Firm—Bielen and Peterson

[57] ABSTRACT

A bicycle frame for bicycles designed for structural strength and for positioning of a chain sprocket above the lowermost portion of the frame. The frame is constructed with a looped tube assembly with a front tube loop connected to a head tube and wheel fork assembly forming a quadrilateral structure of generally triangular shape, and a pair of rear tube loops forming a pair of parallel quadrilateral structures of generally diamond shape, with the front tube loop and rear tube loops being mutually interconnected on a sprocket shell. The looped tube assembly has seat and chain stay bracing, and brackets for mounting a rear wheel between the pair of rear tube loops.

13 Claims, 3 Drawing Figures

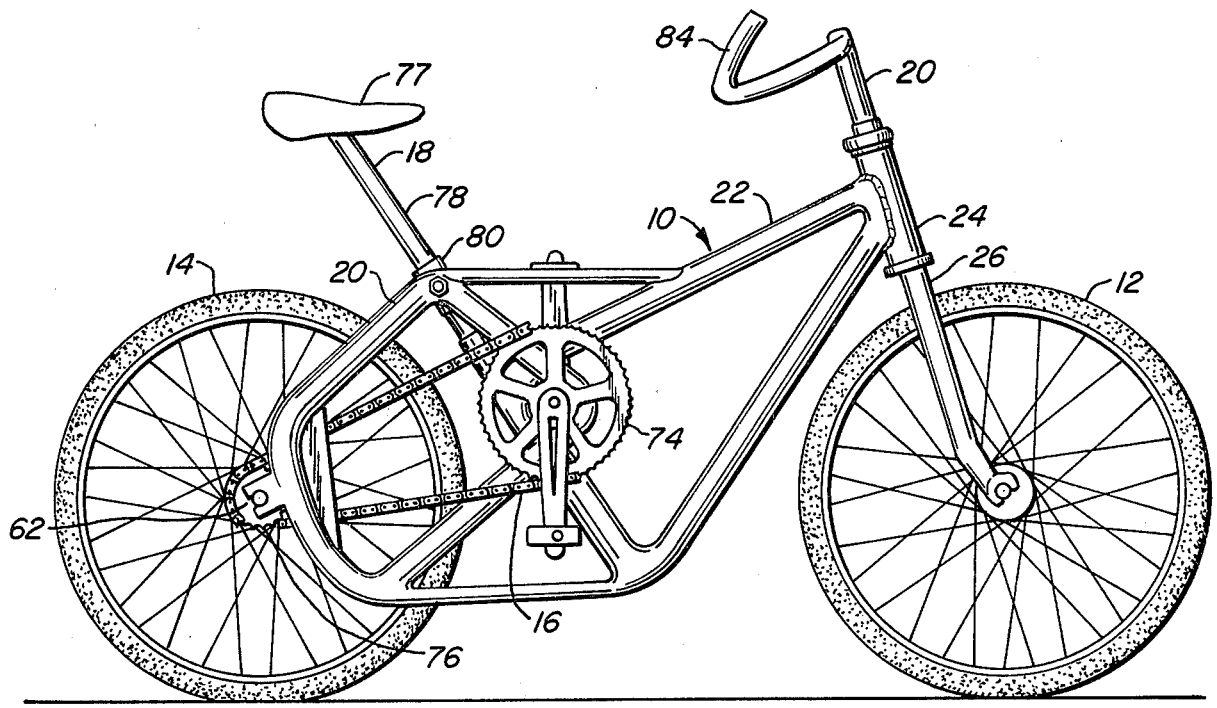
FIG._1.
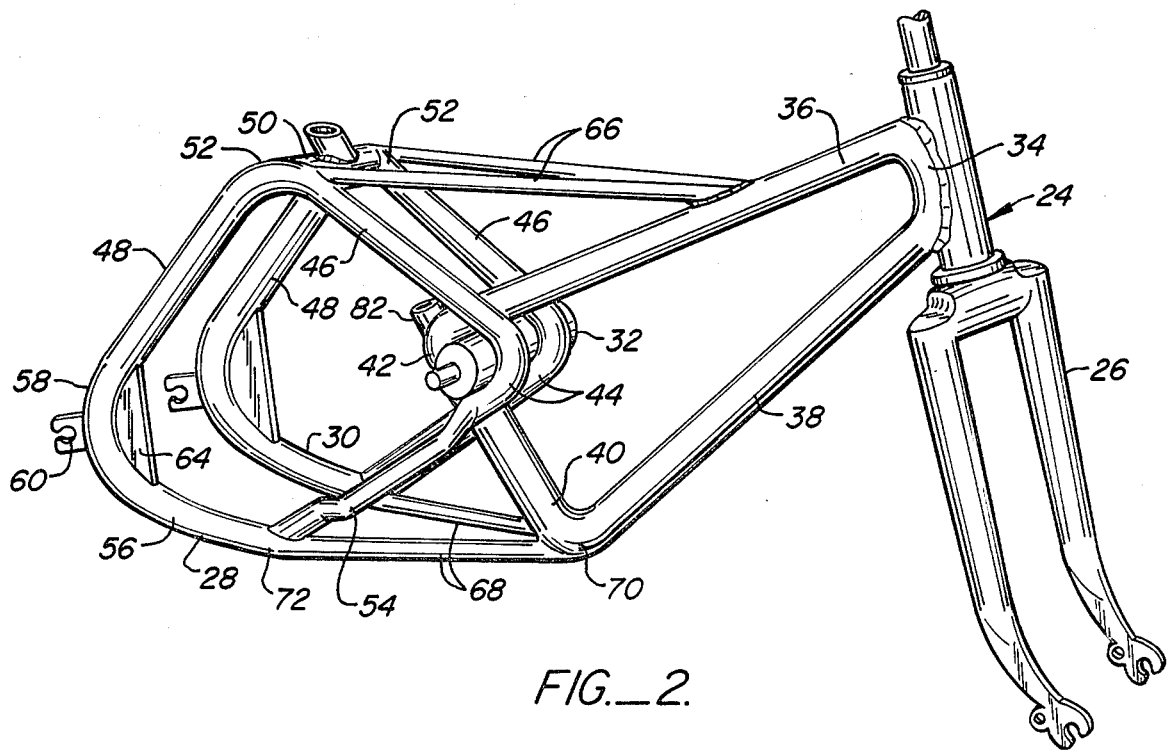
FIG._2.

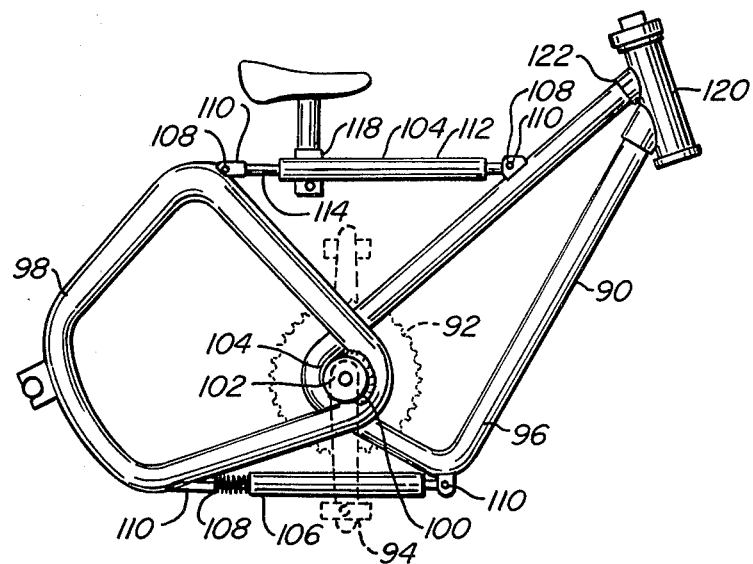
FIG._3.

BICYCLE FRAME

BACKGROUND OF THE INVENTION

The bicycle frame of this invention is designed for heavy duty use and in particular is designed for use over rugged terrain where obstacles might otherwise contact and damage the sprocket on a conventionally constructed frame. The construction of the frame utilizes an interconnected single fore and double aft, loop assembly which provides a high degree of structural integrity. The high strength frame assembly is suitable for a high torque motor cycle, or other motor driven cycle.

Trail or enduro riding has become a popular sport for young cyclists. Specialty bicycles have been constructed to withstand the rigors of a competitive scrambler race over a dirt track with jumps and bumps in a close simulation of scrambler motorcycle racing. Cross country races, similar to motorcycle enduro races have also been devices for pedal bicycles. The bicycles for such competitive uses are conventional in configuration, but are substantially smaller than a standard 26 inch bicycle. Originally such bicycles were customized children's bicycles with small wheels and small frames which provided easy handling and high torque for quick accelerations and short hills. These features were incorporated into the specialty bicycles specifically designed for rugged use. The heavy duty frames, however, had essentially the same configuration as the conventional general use bicycles previously marketed. The frames included a head tube, pivotally supporting the front fork, a horizontal top tube, a nearly verticle seat tube, and a down tube forming a triangle structure with the top tube and seat tube. A pair of spaced seat stays and chain stays connected to the top and bottom of seat tube are joined at the axle of the rear wheel to provide triangular structures for support of the rear wheel. This conventional diamond pattern provides a light weight frame having a structural strength for most uses.

On such frames the sprocket journal is axially located at the interconnection juncture of the down tube, seat tube and chain stays. The sprocket and pedals are thereby exposed below the lowermost extension of the frame and are subject to contact with obstacles when used for trail or scrambler ridings.

The frame assembly of this invention is designed to utilize a looped tube concept for structural strength which is constructed to provide a sprocket location that is protected by the underside of the frame assembly. This configuration avoids a potentially dangerous contact of the sprocket with trail obstacles.

Variations in the particular configuration of the connected closed-loop frame components allow the sprocket to be positiond high in the frame for clearance of the sprocket and pedals above the lower most portion of the frame structure for exceptionally rugged trail use, or relatively low in the frame structure for clearance of the sprocket only, for more general trail use. In both variations, and in other contemplated embodiments between these extremes, the sprocket is protected from contact with trail obstacles.

SUMMARY OF THE INVENTION

The interconnected, closed-loop frame structure of this invention is designed to provide a maximum strength frame structure for motorized or pedal bicycles. The frame structure devised is particularly advantageous for use in pedal bicycles for locating the chain sprocket above the lowermost portion of the frame structure. In such use the closed-loop frame structure is particularly useful for trail or scrambler-type bicycles.

The interconnected, closed-loop bicycle frame of this invention utilizes a conventional type front fork assembly of heavy duty construction for trail use. The fork assembly includes a head tube with a journal bearing interconnecting the handlebars and wheel forks.

Joined to the fork assembly is a front tube loop that in conjunction with the head tube is quadrilateral in configuration. The front tube loop is almost triangular with a portion of the head tube defining the smallest side of the quadrilateral. The front tube loop is either connected at adjacent ends to projecting tube sockets on the head tube or is closed in construction with an interfacing side to the head tube. From the interfacing side, the front tube loop has two elongated rearwardly directed, upper and lower, cross tube sections similar to the top tube and down tube on a conventional frame. The center tube sections are interconnected by a rise tube section completing the loop. At the bend where the riser tube section and upper center tube section merge, is a journal shell containing the bearing mechanisms for the sprocket shaft. The journal shell comprises the juncture axis for the front tube loop and two complimentary rear tube loops.

The two rear tube loops are arranged on each side of the interconnected rear wheel. The rear tube loops are substantially of the same quadrilateral configuration with substantially equal sides. Each tube loop is oriented in a diamond fashion with the foremost bend arranged around the journal shell on each side of the bend of the front tube loop. In the rigid frame structure the tube loops are joined by welding to each other and to the journal shell. The rearmost bend includes a drop-out bracket which in the paired arrangement connects to the axle of the rear wheel in conventional fashion.

For added rigidity, the front tube loop and the two rear tube loops have interconnecting pairs of top stays and bottom stays.

In alternate embodiments, the front tube loop and rear tube loops are allowed a limited articulation at the journal shell. The stays are replaced by elongated shock absorber pistons whereby the front and rear wheels are shock mounted through the frame structure. These and other features will become apparent upon a consideration of the detailed description of the preferred embodiments.

BRIEF DESCRIPTION OF THE DRAWINGS

FIG. 1 is a side elevational view of a bicycle frame of this invention and its associated components.

FIG. 2 is a perspective view of the bicycle frame of FIG. 1 without the associated components.

FIG. 3 is a side elevational view of an alternate embodiment of the bicycle frame.

DETAILED DESCRIPTION OF THE PREFERRED EMBODIMENTS

Referring to FIG. 1, the interconnected, closed-loop bicycle frame of the subject invention is shown with the auxilliary components for an assembled bicycle. The bicycle frame 10 has added thereto a front wheel 12, a rear wheel 14, a pedal sprocket and chain assembly 16, a seat assembly 18 and handle bars 20. While the auxilliary components are specially constructed for use with the frame 10, they are, in general, conventional in construction and modified for the particular design of the novel frame.

The structure of the frame 10 is comprised principally of three closed loops of light weight, high strength tubing. The three loops are arranged with a front tube loop 22 connected to a head tube 24 of a front fork assembly 26, and a pair of spaced rear tube loops 28 and 30 positioned on each side of the rear wheel 14. The front tube loop 22 is interconnected with the pair of rear tube loops 28 and 30 at a journal shell 32 as shown with greater clarity in the perspective view of the frame 10 without the auxilliary components in FIG. 2.

As shown in FIGS. 1 and 2 the front tube loop 22 is bent to a quadrilateral configuration with a short connecting tube section 34 indented to conform to the cylindrical surface of the head tube 24 to which it is welded. The front tube loop is bent to form upper and lower elongated cross tube sections, 36 and 38, respectively, with a joining riser tube section 40 completing the closed loop. The upper bend 42 at the juncture of the riser tube section 40 and upper cross tube section 36 partially encompasses the journal shell 32 to which the tube loop is connected by welding.

Similarly, the rear tube loops, 28 and 30, are bent to quadrilateral configurations, of more uniform diamond shape than the almost triangular shape of the front tube loop. The front bends 44 of the rear tube loops partially encompass the journal shell 32 such that the rear tube loops are spaced from one another and are positioned on each side of the bend 42 of the front tube loop that engages the journal shell. The tube loops, 28 and 30, have fore and aft seat tube sections, 46 and 48, for support of the seat support cross brace 50 at the top bend 52 of the tube loops. Fore and aft wheel support sections, 54 and 56, complete the closed loop configuration of the rear tube loop structure. The rear bends 58 of the tube loops are provided with drop-out brackets 60 for engaging the rear wheel axle 62. For added strength a brace plate 64 is welded to the rear wheels 58 opposite the dropout brackets 60.

The embodiment of the structural bicycle frame 10 of FIGS. 1 and 2 is rigid in construction with the front tube loop 22 and rear tube loops, 28 and 30, welded to the journal shell 32 and to one another. Added structural bracing is provided by substantially horizontal top seat stays 66. The stays 66 are joined at one end to the middle of the upper cross section 36 of the front tube loop 22 and at the other end to the fore seat tube section 46 at the top bend 52. Similarly, substantially horizontal chain stays 68 are joined at one end to the riser section 40 at the lower bend 70 of the front tube loop 22, and, at the other end to the wheel support section 54 at the bottom bend 72 of the rear tube loops, 28 and 30.

The rear tube loop 28 on the sprocket side of the frame has the wheel support section 54 deformed inwardly to accomodate passage of a sprocket chain 72 without contacting the tubular support section 54 during tracking on the pedal sprocket 74 and rear wheel sprocket 76.

The seat assembly 18 includes a seat 77 and support column 78 which adjustably engages a first clamping sleeve 80 mounted on the cross brace 50 and a second clamping sleeve 82 mounted on the upper bend 42 of the riser tube section 40 of the front tube loop 22. The end of the support column telescopes into the riser tube section allowing substantial adjustment to the seat 76 of the seat assembly. The relatively high and rearward position of the seat 76 allows for relatively normal pedal action and a greater than customary weight distribution to the rear wheel for easy manipulation and raising of the front wheel when the upwardly curved handle bars 84 are pulled back.

The particular embodiment of the bicycle frame of FIGS. 1 and 2 is structured to maintain both the sprocket 74 and the pedals 86 above the lowermost part of the frame.

Referring to the alternate embodiment of FIG. 3, a bicycle frame 90 is shown which has a structure that elevates only an attached sprocket 92, (shown in phantom) and not its component sprocket pedals 94, above the lowermost part of the frame. In this embodiment, the pedals 94 in their lowermost position will project below the frame and must be oriented in a horizontal coast position when interfering obstacles are encountered. This lower positioning of the sprocket is accomplished by a reconfiguration of a front tube loop 96 and rear tube loops 98, such that their axis of interconnection provides a lower positioning of the encompassed sprocket journal 100.

As a further modification to the frame structure, the rear tube loops 98 are joined to the internal casing 102 of the sprocket journal and the front tube loop 96 is joined to a sleeve bearing 104 on the middle of the casing 102. In this arrangement the front tube loop can articulate with respect to the rear tube loop about the axis of the journal 100. The degree of articulation is limited by pairs of elongated piston-type shock absorbers 104 and 106 mounted in the position of the rigid seat stays 66 and chain stays 68 of the embodiment of FIGS. 1 and 2. The shock absorbers have end pins 108 connecting the absorbers to pin brackets 110 fixed to the tubular frame. The absorbers 104 and 106 are designed with long outer casings 112 with short displacement pistons 114, such that only a short length of piston is exposed. This enables the tough outer casing 112, in the case of the bottom absorbers 106, to guard the chain sprocket 92. The pistons (not visible) of the bottom absorbers 106 are protected by an accordian boot 116.

In this arrangement the supporting clamp 118 for the seat post are preferably connected to the outer casings 112 of the top absorbers 104 to maintain a relatively stability between seat and handlebars (not shown) when riding on rough terrain.

Alternately, the supporting clamp may be mounted on a cross bracket between the rear tube loops as in the embodiment of the frame of FIGS. 1 and 2.

While a complete loop of the tubes is preferred, with attachment to the head tube in the manner shown in FIG. 1, the front tube loop may be open ended with its connection to the head tube being facilitated by sockets 122. Because of the proximity of the two sockets 122, there is little loss of strength.

While in the foregoing description embodiments of the invention have been set forth in considerable detail for the purposes of making a complete disclosure of the invention, it should be apparent to those of ordinary skill in the art that numerous changes may be made in such detail without departing from the spirit and principles of the invention.

What is claimed is:

1. A bicycle frame comprising a looped tube assembly having a front tube loop, a pair of spaced, parallel rear tube loops, and an interconnection means for interconnecting said front tube loop and said pair of rear tube loops, wherein said front tube loop has connected thereto a conventional head tube and front fork assembly, said front tube loop with said head tube forming a substantially quadrilateral structure with upper and lower rearward bends; each of said rear tube loops form substantially quadrilateral structures of generally diamond shape with top and bottom, and front and rear bends; and, wherein said means for interconnecting said front tube loop and said pair or rear tube loops comprises an interconnecting structural device which engages the inside of the upper rearward bend of said front tube loop and the inside of the front bends of said tube loops which are arranged on each side of said upper rearward bend of said front tube loop.

2. The bicycle frame of claim 1 comprising further structural bracing between an upper portion of said rear tube loops and an upper portion of said front tube loop and structural bracing between a lower portion of said rear tube loops and a lower portion of said front tube loop.

3. The bicycle frame of claim 2 wherein said bracing comprises a first pair of rigid structural stays having first ends connected to the top bends of said rear tube loops and second ends connected to the upper portion of said front tube loop, and a second pair of rigid structural stays having first ends connected to the bottom bends of said rear tube loops and second ends connected to the lower portion of said front tube loop.

4. The bicycle frame of claim 2 wherein said interconnecting structural device comprises a journal shell, said journal shell having a sprocket assembly with connected sprocket and pedals, wherein said journal location maintains at least said sprocket above the lowermost portion of said frame assembly.

5. The bicycle frame of claim 4 wherein said journal shell location maintains both said sprocket and said pedals above the lowermost portion of said frame assembly.

6. The bicycle frame of claim 5 wherein said pair of said rear tube loops have mounted to each rear bends a drop-out bracket for mounting of a rear wheel.

7. The bicycle frame of claim 5 wherein a portion of one of said rear tube loops adjacent said sprocket is deformed to permit a sprocket chain free passage to a rear wheel mounted to said frame.

8. The bicycle frame assembly of claim 7 comprising further a seat post bracket and frame brace joined between the top bends of said pair of rear tube loops.

9. The bicycle frame of claim 2 wherein said interconnecting structural device includes means for interconnecting with limited articulation said front tube loop and said pair of rear tube loops, and wherein said bracing comprises shock absorber means for allowing restricted articulation of said front tube loop and said pair of rear tube loops.

10. A bicycle frame comprising a looped tube assembly having a front tube loop, a pair of spaced, parallel rear tube loops, and an interconnection means for interconnecting said front tube loop and said pair of rear tube loops wherein said interconnecting means comprises a journal shell with a sprocket and pedals, said journal shell engaging the inside of said front tube loop and the inside of said pair of rear tube loops.

11. The bicycle frame of claim 10 comprising further structural bracing between an upper portion of said rear tube loops and an upper portion of said front tube loop and structural bracing between a lower portion of said rear tube loops and a lower portion of said front tube loop.

12. The bicycle frame of claim 11 wherein said bracing comprises a first pair of rigid structural stays having first ends connected to the upper portion of said rear tube loops and second ends connected to the upper portion of said front tube loop and a second pair of rigid structural stays having first ends connected to the lower portion of said rear tube loops and second ends connected to the lower portion of said front tube loop.

13. The bicycle frame of claim 12 wherein said journal shell includes means for interconnecting said loops with limited articulation and said bracing comprises shock absorber means for allowing restricted articulation of said front tube loop and said pair of rear tube loops.

* * * * *